United States Patent
Tseng

(10) Patent No.: US 11,872,673 B2
(45) Date of Patent: Jan. 16, 2024

(54) OIL DRAIN COMBINATION FOR BRAKE

(71) Applicant: Chao-Ching Tseng, Taichung (TW)

(72) Inventor: Chao-Ching Tseng, Taichung (TW)

( * ) Notice: Subject to any disclaimer, the term of this patent is extended or adjusted under 35 U.S.C. 154(b) by 181 days.

(21) Appl. No.: 17/567,906

(22) Filed: Jan. 4, 2022

(65) Prior Publication Data

US 2023/0211474 A1    Jul. 6, 2023

(30) Foreign Application Priority Data

Jan. 12, 2021 (TW) .................... 110101189

(51) Int. Cl.
*B25B 13/48* (2006.01)
*B60T 11/28* (2006.01)

(52) U.S. Cl.
CPC .......... *B25B 13/48* (2013.01); *B60T 11/28* (2013.01)

(58) Field of Classification Search
CPC . B25B 13/48; B25B 27/24; B60S 5/00; B60T 11/28; B60T 11/30; B60T 17/222
See application file for complete search history.

(56) References Cited

U.S. PATENT DOCUMENTS

| | | | | |
|---|---|---|---|---|
| 3,301,282 A * | 1/1967 | Fresolone, Jr. | ....... | B60T 17/222 81/184 |
| 3,635,262 A * | 1/1972 | Stebbins | ........... | B60T 17/222 141/98 |
| 4,905,731 A * | 3/1990 | Tamashiro | ........... | B25B 13/48 7/164 |
| 7,004,214 B1 * | 2/2006 | Awad | ................ | B25B 7/02 141/351 |
| 9,987,731 B2 * | 6/2018 | Chuang | ............ | B25B 23/108 |
| 11,065,741 B2 * | 7/2021 | Dahl | ............. | B60T 17/222 |
| 11,383,690 B2 * | 7/2022 | Tutor | ............. | B25B 13/06 |
| 2013/0174918 A1 * | 7/2013 | Rodrigues-Morgado | .............. | F15B 21/044 137/15.01 |

FOREIGN PATENT DOCUMENTS

| TW | I544989 | 8/2016 |
|---|---|---|
| TW | M579077 | 6/2019 |

* cited by examiner

*Primary Examiner* — David B. Thomas

(57) ABSTRACT

An oil drain combination for a brake contains: a wrench and a draining assembly. The wrench is a ratchet wrench. The draining assembly is connected in the wrench and includes a coupling shaft, a fitting member, a first joining tube, and a fixing member. The fitting member is rotatably accommodated in a drive head of the wrench. An axial line of the fixing member extends from the first segment of the fixing member to a second segment of the fixing member and insects with a central line of the coupling shaft perpendicularly. The first joining tube has an accommodation orifice and an axial orifice. The coupling shaft has a blind orifice and multiple radial orifices. The fixing member has a first connection hole communicating with a second connection hole.

8 Claims, 8 Drawing Sheets

OIL DRAIN COMBINATION FOR BRAKE

FIELD OF THE INVENTION

The present invention relates to an oil drain combination for a brake of a vehicle.

BACKGROUND OF THE INVENTION

A closed hydraulic circuit of a conventional hydraulic brake system uses a drain screw as a component connected to the outside. The user uses a drain tool to fit with and loosen the drain screw, such that the used brake oil is discharged via the drain tool and the discharge conduit communicating with the drain tool.

A conventional drain tool is disclosed in the Taiwanese Patent Publication Nos. I544989 and M579077, and the conventional drain tool contains: a draining assembly and a wrench. The draining assembly is received in a receiving orifice of a work segment of the wrench, wherein a fitting sleeve of the draining assembly is located on a side of the work segment of the wrench to fit with a drain screw. A coupling member of the draining assembly is located on the other side of the work segment of the wrench to connect with an oil discharge conduit. The fitting sleeve and the coupling member extend on the two sides of the work segment of the wrench linearly, and an axial length of the fitting sleeve and the coupling member increases an axial distance of the work segment of the wrench. Thereby, the work segment of the wrench and the oil discharge conduit have to be accommodated beside the drain screw of the conventional drain tool sufficiently. However, an accommodation space for accommodating the work segment of the wrench and the oil discharge conduit is limited by a wheel, a rim, a connection shaft, and a brake of the wheel, thus operating the oil drain tool troublesomely and discharging the used brake oils via the oil discharge conduit difficultly.

The present invention has arisen to mitigate and/or obviate the afore-described disadvantages.

SUMMARY OF THE INVENTION

The primary objective of the present invention is to provide an oil drain combination for a brake which is capable of decreasing the axial distance of the work segment of the oil drain combination, adjustably changing an angle of the work segment of the oil drain combination based on using requirements.

Another objective of the present invention is to provide an oil drain combination for a brake which contains the first segment of the fixing member rotatably connected with the second segment of the coupling shaft within and at 360 degrees, such that the oil drain combination is operated in a limited space, is capable of adjustably changing the angle of the work segment of the oil drain combination based on the using requirements, extending the discharge hose freely to discharge the used brake oils smoothly.

To obtain above-mentioned objective, an oil drain combination for a brake provided by the present invention contains: a wrench and a draining assembly.

The wrench is a ratchet wrench configured to switch a rotation direction and is rotated back to an original position bidirectionally.

The draining assembly is connected in the receiving orifice of a drive head of the wrench, and the draining assembly includes a coupling shaft, a fitting member, a first joining tube, and a fixing member.

The fitting member is rotatably accommodated in the receiving orifice of the drive head. A first segment of the fitting member is connected with or is removed from a first segment of the coupling shaft. A first end of the first joining tube is fitted in the first segment of the coupling shaft and inserts into the fitting member. A first segment of the fixing member is rotatably connected with a second segment of the coupling shaft. An axial line of the fixing member extends from the first segment of the fixing member to a second segment of the fixing member and insects with a central line of the coupling shaft perpendicularly.

The first joining tube has an accommodation orifice extending along a central axis thereof, and the first joining tube has an axial orifice communicating with the accommodation orifice. The coupling shaft has a blind orifice extending in a central axis thereof and communicating with the axial orifice of the first joining tube, the coupling shaft further has multiple radial orifices communicating with the blind orifice. The fixing member has a first connection hole communicating with a second connection hole and the multiple radial orifices of the coupling shaft. The axial orifice of the first joining tube, the blind orifice and the multiple radial orifices of the coupling shaft, and the first connection hole and the second connection hole of the fixing member form an oil supply path.

Thereby, the axial line extends from the first segment to the second segment and insects with the central line of the coupling shaft perpendicularly so that an axial distance of the work segment of the oil drain combination is decreased, and the oil drain combination is inserted into a limited space to discharge the used brake oils. The drive head is rotated around the connection element to adjustably change an angle of the work segment of the oil drain combination based on using requirements. Furthermore, the fixing member rotates along the coupling shaft freely so that the discharge hose extends freely based on the using requirements to discharge the used brake oils smoothly.

DETAILED DESCRIPTION OF THE PREFERRED EMBODIMENTS

With reference to FIGS. 1-5, an oil drain combination for a brake according to a preferred embodiment of the present invention comprises a wrench 10 and a draining assembly 20.

Figure 7:
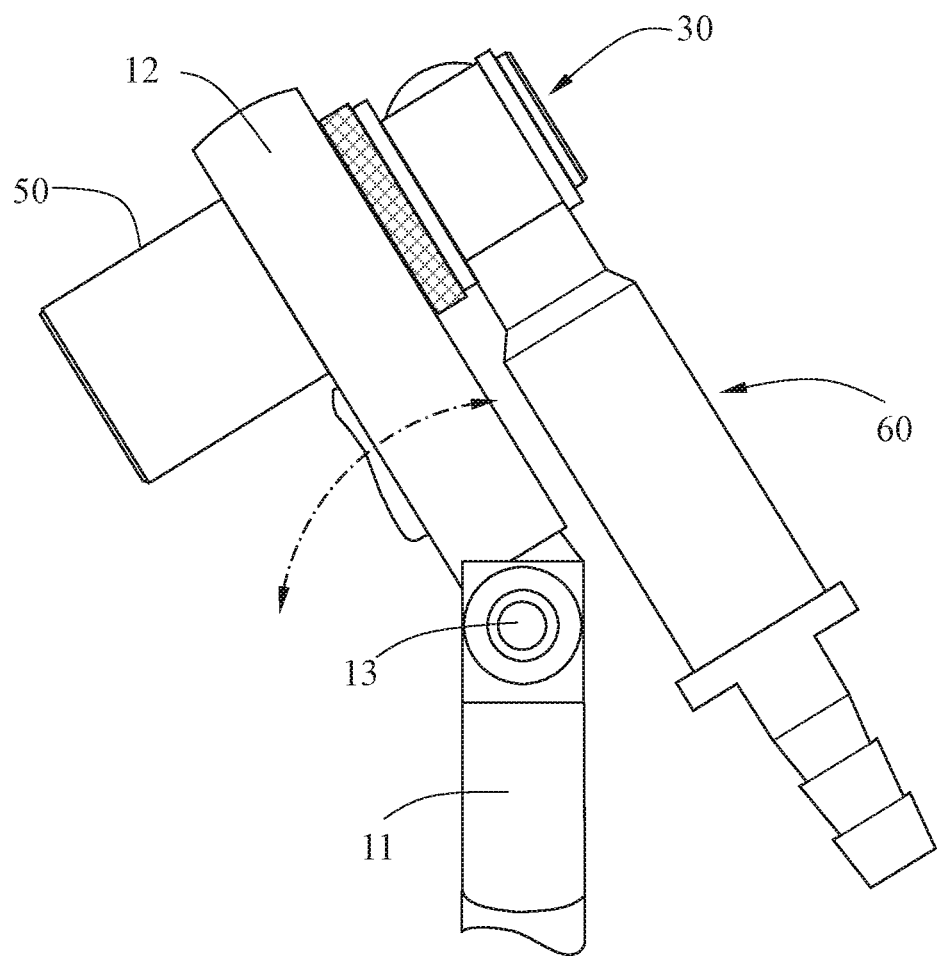
FIG. 7 is another cross sectional view showing the operation of the oil drain combination according to the preferred embodiment of the present invention.

The wrench 10 is a ratchet wrench configured to switch a rotation direction and rotated back to an original position bidirectionally. The wrench 10 includes a grip 11, a drive head 12, a connection element 13 configured to rotatably connect the grip 11 and the drive head 12 so that the drive head 12 is rotated around the connection element 13 to change a connection angle of the drive head 12 and the grip 11 (as shown in FIG. 7). The drive head 12 has a ratchet 14 with a receiving orifice 15 in a plum flow shape or a polygon shape. The wrench 10 further includes a switch element 16 configured to switch a rotation direction of the ratchet 14 and to drive the ratchet 14 to move back to an original position. Since the ratchet wrench is a well-known prior art, further remarks are omitted.

The draining assembly 20 is connected in the receiving orifice 15 of the drive head 12, and a work segment of the oil drain combination is defined by the drive head 12 and the draining assembly 20.

The draining assembly 20 includes a coupling shaft 30, a fitting member 50, and a fixing member 60. The fitting member 50 is an elongated fitting sleeve, a short fitting sleeve or a connection rod. In this embodiment, the fitting member 50 is the short fitting sleeve. The fitting member 50 is rotatably accommodated in the receiving orifice 15 so that the ratchet 14 actuates the fitting member 50 to rotate therewith. A first segment 51 of the fitting member 50 is connected with or is removed from a first segment 31 of the coupling shaft 30 so as to replace other fitting members 50 of different sizes and shapes, wherein the first segment 51 is an internal threaded section.

Figure 1:
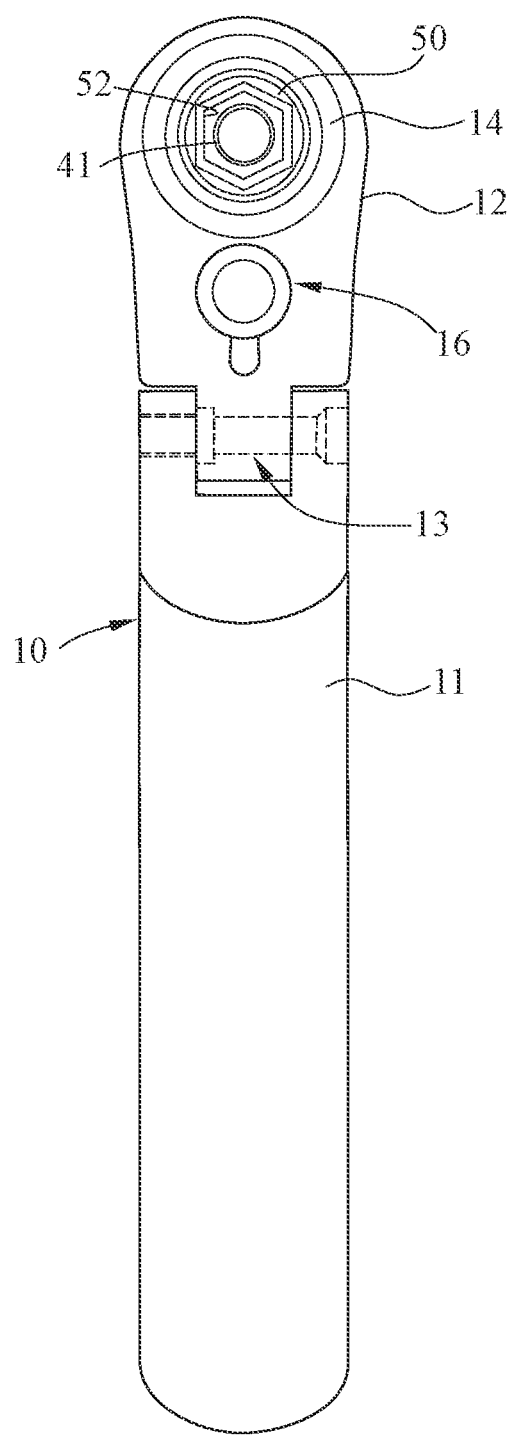
FIG. 1 is a front elevational view showing the assembly of an oil drain combination for a brake according to a preferred embodiment of the present invention.
Figure 2:
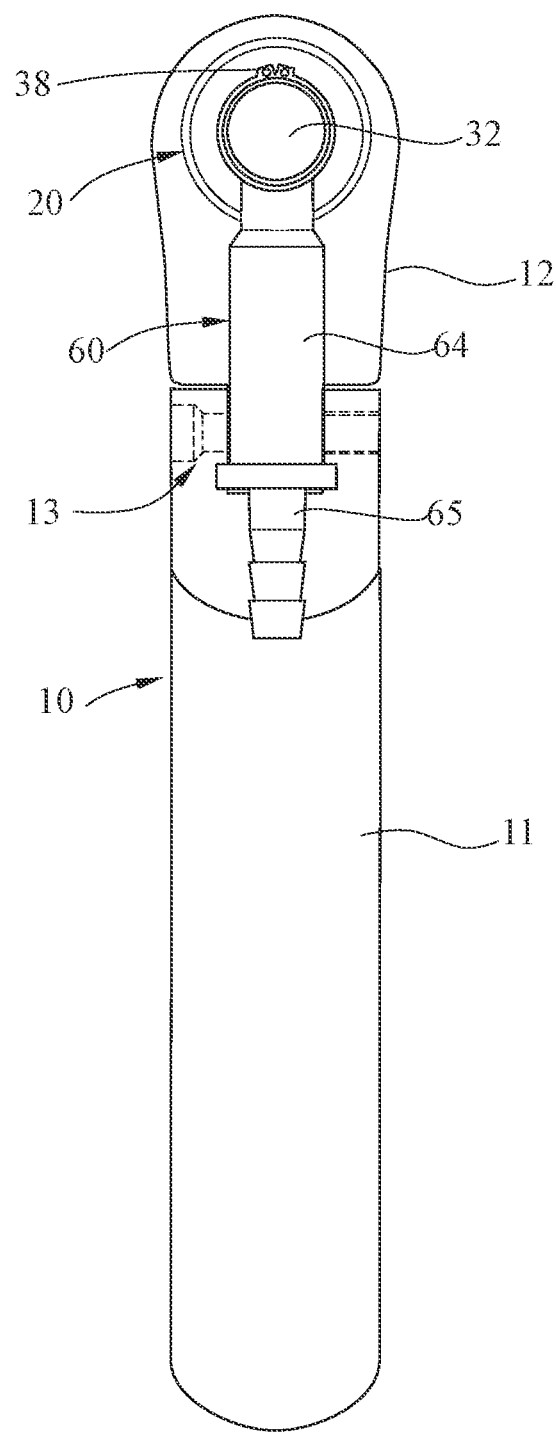
FIG. 2 is a rear elevational view showing the assembly of the oil drain combination for the brake according to the preferred embodiment of the present invention.
Figure 3:
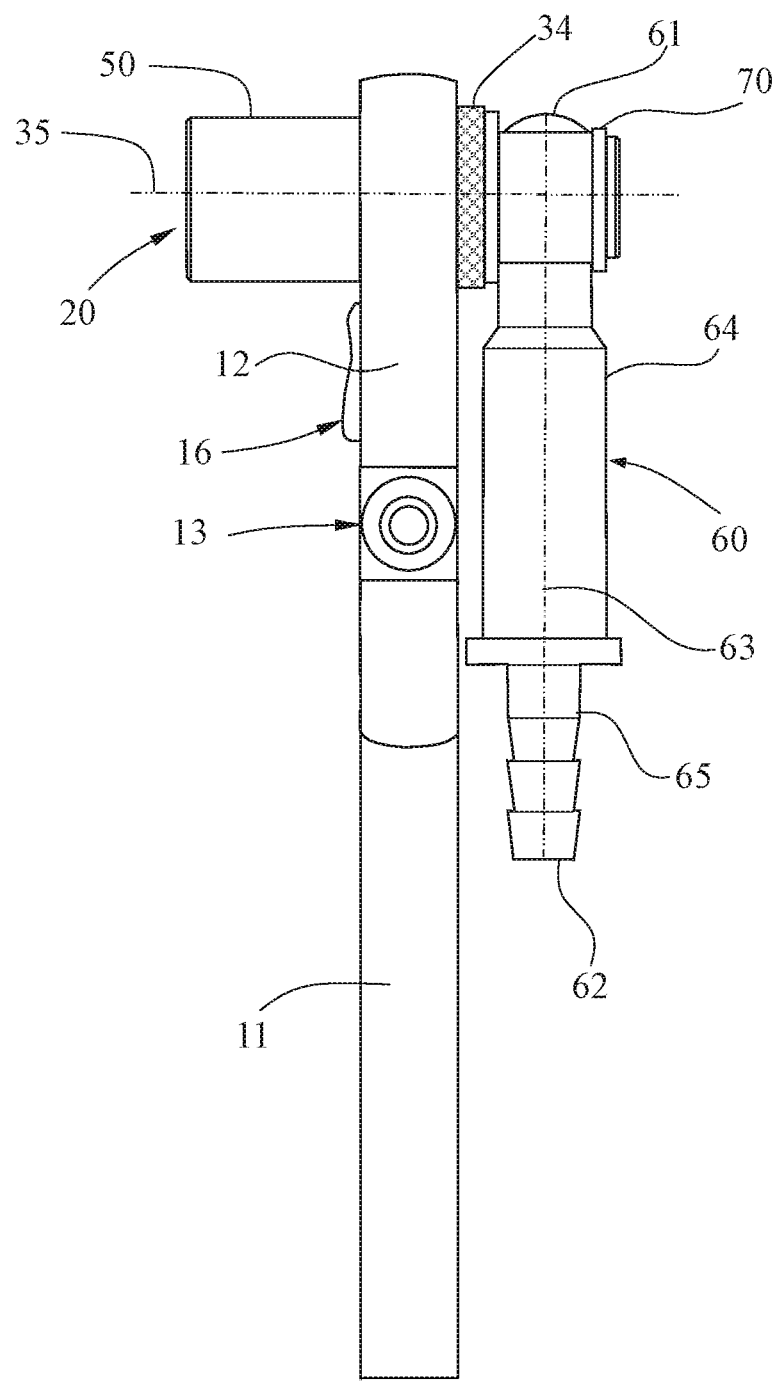
FIG. 3 is a side elevational view showing the assembly of the oil drain combination for the brake according to the preferred embodiment of the present invention.
Figure 4:
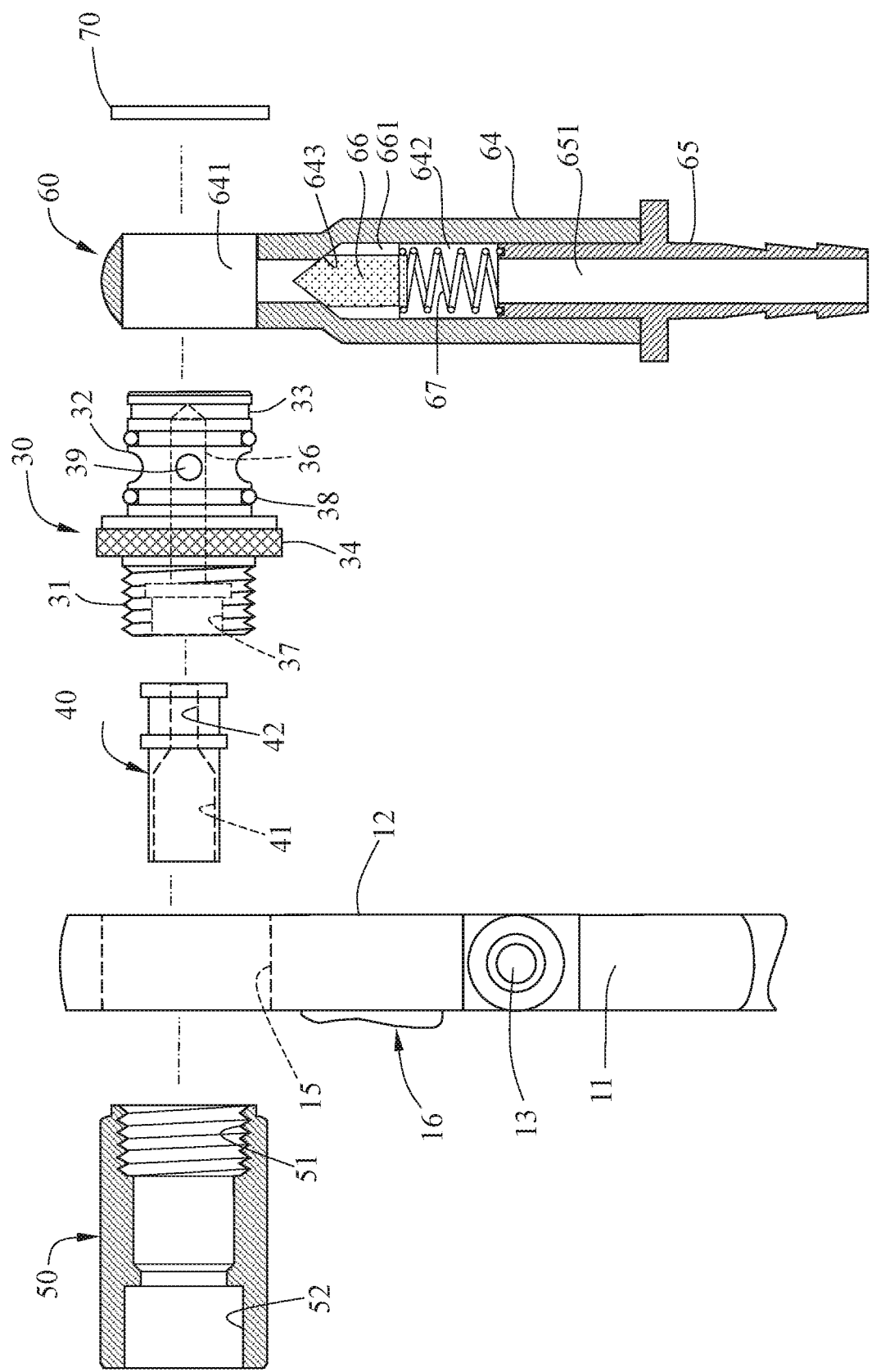
FIG. 4 is a cross sectional view showing the exploded components of the work segment of the oil drain combination according to the preferred embodiment of the present invention.
Figure 5:
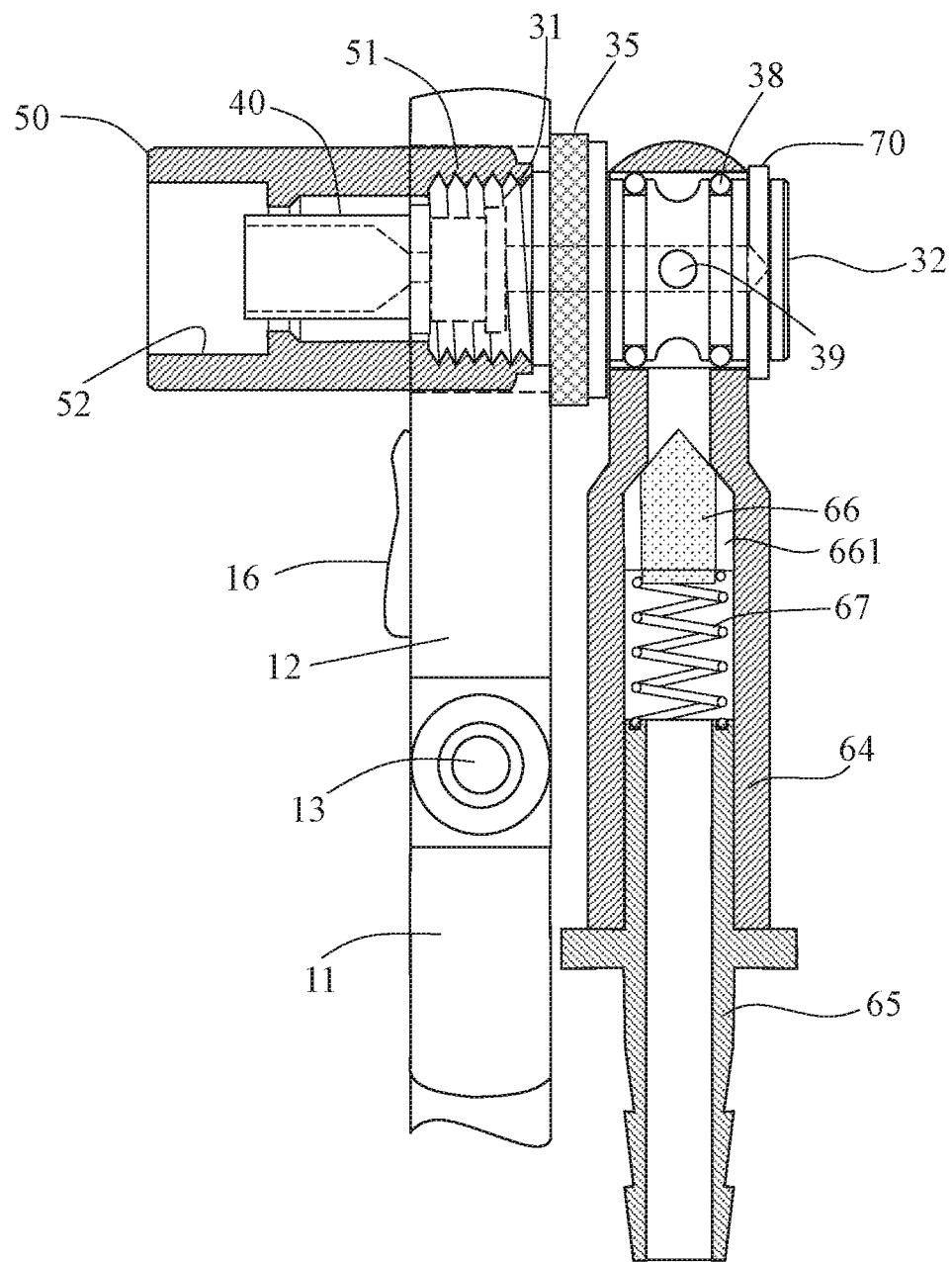
FIG. 5 is a cross sectional view showing the assembly of the work segment of the oil drain combination according to the preferred embodiment of the present invention.

A first segment 61 of the fixing member 60 is rotatably connected with a second segment 32 of the coupling shaft 30 within and at 360 degrees, wherein an axial line 63 extends from the first segment 61 to a second segment 62 and insects with a central line 35 of the coupling shaft 30 perpendicularly, and a flowing conduit communicates with exteriors of the fitting member 50, the coupling shaft 30, and the fixing member 60. As shown in FIG. 2, when draining used brake oils, the fitting member 50 fitted on a drain screw 71 of a brake oil system is rotated loosely so that the second segment 62 of the fixing member 60 is connected with a discharging conduit 72, and the used brake oils discharge out of the brake oil system by way of the oil drain combination, thus supplying new brake oils into the brake oil system.

The first segment 31 of the coupling shaft 30 is an external threaded section, and the second segment 32 of the coupling shaft 30 is an axial extension, wherein a stop portion 34 is defined between the threaded section 31 and the axial extension 32 of the coupling shaft 30, a diameter of the stop portion 34 is more than a diameter of the axial extension 32, and the axial extension 32 has a recess 33 defined on a free end thereof.

The coupling shaft 30 has a blind orifice 36 extending in a central axis thereof, a positioning orifice 37 communicating with the blind orifice 36, two sealing rings 38 fitted on two connection portions of the axial extension 32 and the fixing member 60, and multiple radial orifices 39 defined on the axial extension 32 between the two sealing rings 38 and communicating with the multiple radial orifices 39 and the blind orifice 36.

A first joining tube 40 is made of flexible material, a first end of the first joining tube 40 is fitted in the positioning orifice 37 of the coupling shaft 30, and a second end of the first joining tube 40 extends out of the coupling shaft 30. The first joining tube 40 has an accommodation orifice 41 extending along a central axis thereof, and the first joining tube 40 has an axial orifice 42 communicating with the accommodation orifice 41.

The fitting member 50 has a locating orifice 52 communicating through a central axis thereof. The fitting member 50 has a threaded screwing section formed on an end of an inner wall thereof. The threaded section 31 of the coupling shaft 30 extends into the receiving orifice 15 of the drive head 12, and the stop portion 34 abuts against a side of the drive head 12. The external threaded section 31 of the coupling shaft 30 is screwed with the internal threaded section 51 of the fitting member 50. The first joining tube 40 extends out of the coupling shaft 30 and inserts into the fitting member 50. Thereby, the fitting member 50 is replaced by using the internal threaded section 51 of the fitting member 50 and the threaded section 31 of the coupling shaft 30.

The fixing member 60 has a second joining tube 64 and a connector 65, wherein the second joining tube 64 has a circular orifice 641 defined on a first end thereof and fitting with the axial extension 32, and the first end of the second joining tube 64 is the first segment 61 of the fixing member 60.

An engagement loop 70 is rotatably engaged in the recess 33 to avoid a removal of the second joining tube 64 from the axial extension 32. A first end of the connector 65 is fitted on a distal end of the second joining tube 64, and a second end of the connector 65 extends out of the second joining tube 64, wherein the second end of the connector 65 extends out of the second joining tube 64. The second joining tube 64 has a first connection hole 642, and the connector 65 has a second connection hole 651 defined thereon, wherein the first connection hole 642 is in communication with the circular orifice 641, and a control sleeve 66 is defined between the first connection hole 642 and the second connection hole 651 to open or close a communication of the first connection hole 642 and the second connection hole 651. The control sleeve 66 is received in the first connection hole 642, a spring 67 contacts with the control sleeve 66 and the connector 65, wherein the spring 67 pushes the control sleeve 66 to abut against a contact fence 643 of the first connection hole 642 so as to close the first connection hole 642 and the second connection hole 651. The control sleeve 66 has multiple conduits 661 axially defined therein.

Figure 6:
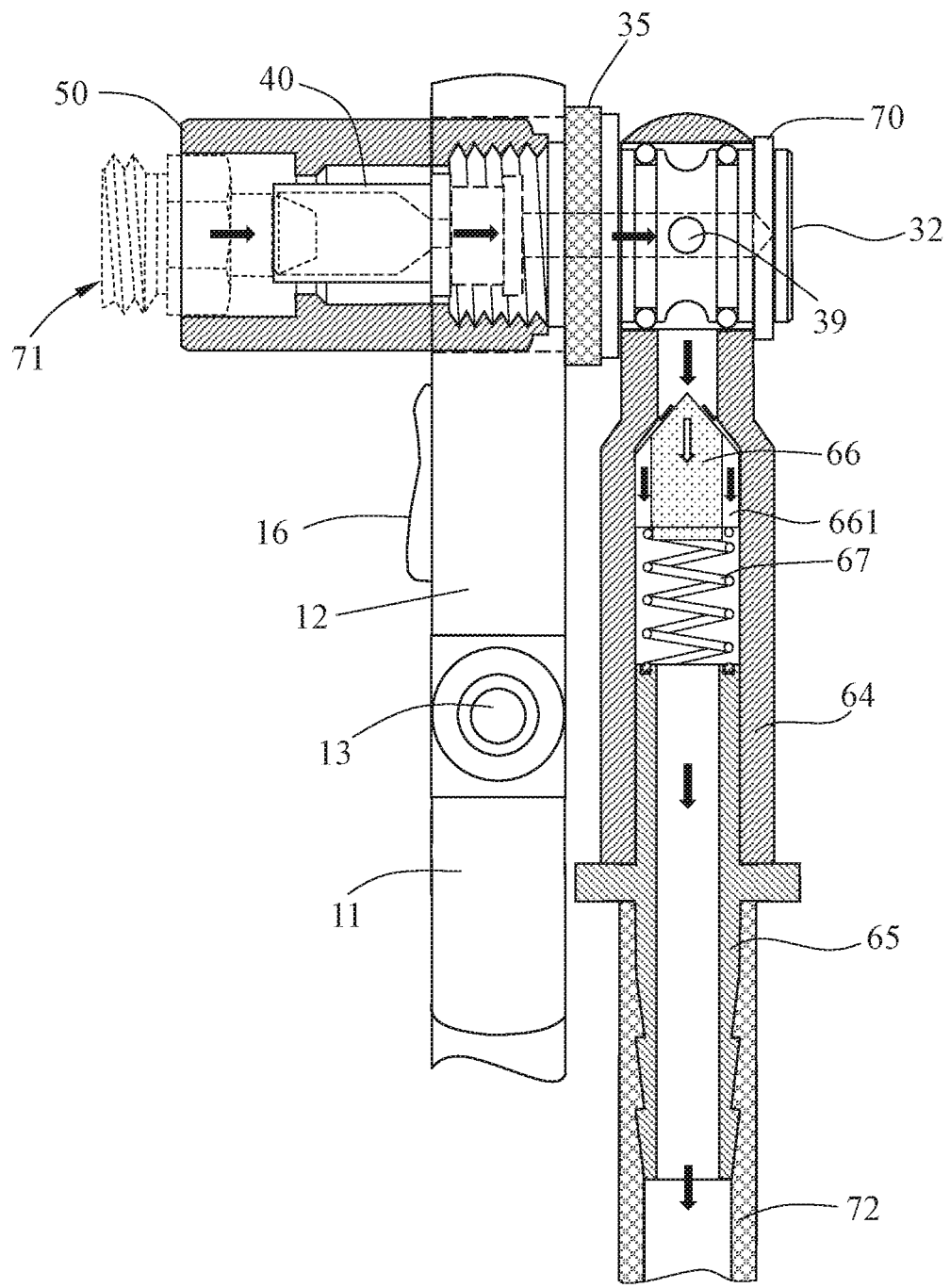
FIG. 6 is a cross sectional view showing the operation of the oil drain combination according to the preferred embodiment of the present invention.

Referring to FIG. 6, the accommodation orifice 41 and the axial orifice 42 of the first joining tube 40, the blind orifice 36 and the multiple radial orifices 39 of the coupling shaft 30, the first connection hole 642 of the second joining tube 64, and the second connection hole 651 of the connector 65 form an oil supply path.

When discharging the used brake oils, the locating orifice 52 of the fitting member 50 is fitted on the drain screw 71 of the brake oil system, the first joining tube 40 is fitted to a nozzle of the drain screw 71, and the connector 65 is connected with a discharge hose 72. The wrench 10 is rotated, the ratchet 14 urges the fitting member 50 to rotate so that the drain screw 71 is rotated loosely by the fitting member 50, and the used brake oils flow from the drain screw 71 via the axial orifice 42 of the first joining tube 40, the blind orifice 36 and the multiple radial orifices 39 of the coupling shaft 30 to push the control sleeve 66 to open so that a discharging gap produces among the control sleeve 66, the contact fence 643, and the first connection hole 642. Thereafter, the used brake oils flow out of the discharge hose 72 via the multiple conduits 661 and the second connection hole 651. Furthermore, the second joining tube 64 and the connector 65 rotate along the axial extension 32 freely so that the axial extension 32 does not drive the fixing member 60 to revolve and the discharge hose 72 is not interfered, when the oil drain combination rotates the drain screw 71 loosely.

Figure 8:
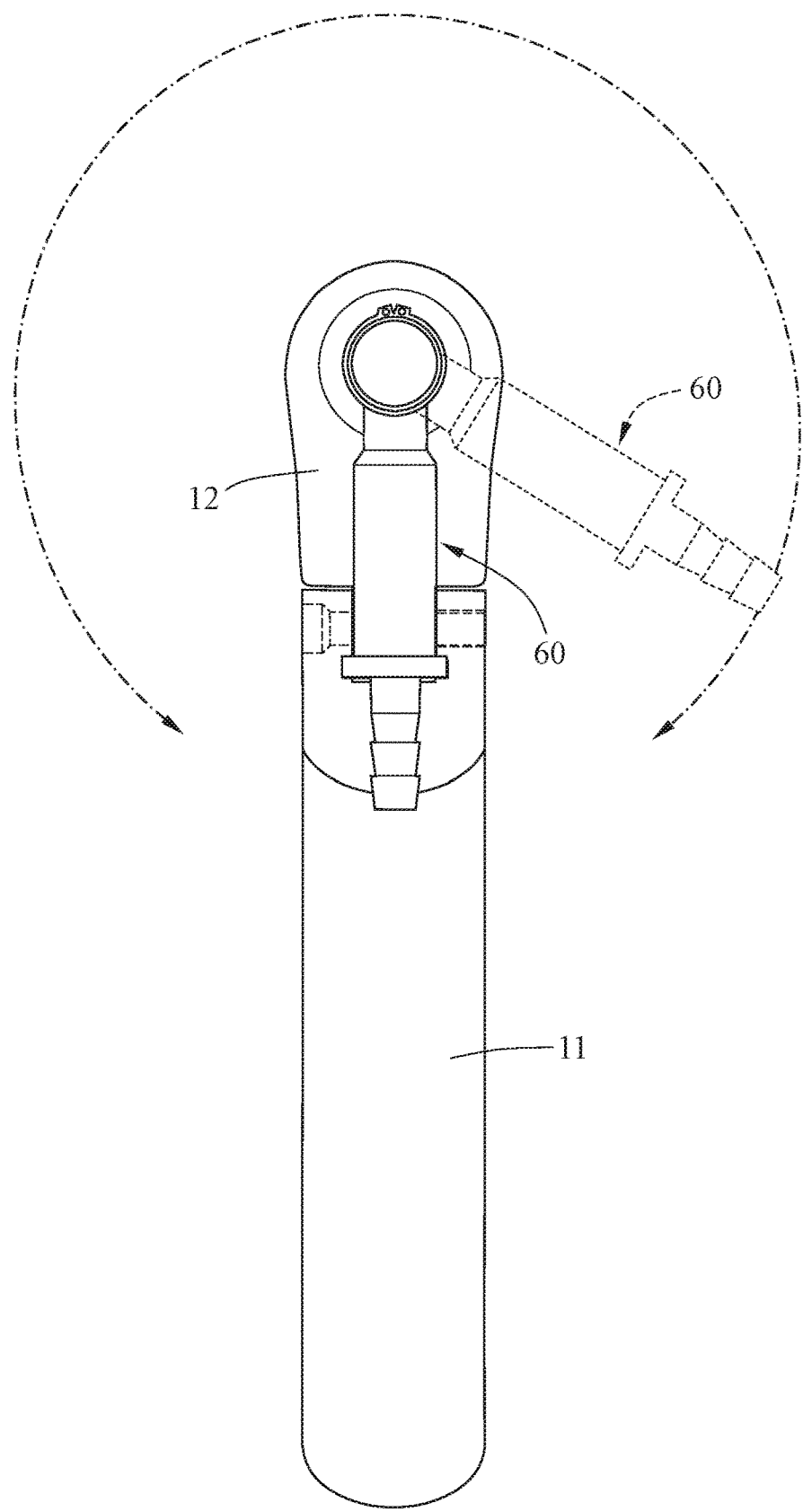
FIG. 8 is also another cross sectional view showing the operation of the oil drain combination according to the preferred embodiment of the present invention.

Thereby, the axial line 63 extends from the first segment 61 to the second segment 62 and insects with the central line 35 of the coupling shaft 30 perpendicularly so that an axial distance of the work segment of the oil drain combination is decreased, and the oil drain combination is inserted into a limited space to discharge the used brake oils. The drive head 12 is rotated around the connection element 13 to adjustably change an angle of the work segment of the oil drain combination (as illustrated in FIG. 7) based on using requirements. Furthermore, the fixing member 60 rotates along the coupling shaft 30 freely (as shown in FIG. 8) so that the discharge hose 72 extends freely based on the using requirements to discharge the used brake oils smoothly.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An oil drain combination for a brake comprising: a wrench and a draining assembly;
   the wrench being a ratchet wrench configured to switch a rotation direction and rotated back to an original position bidirectionally;
   the draining assembly being connected in the receiving orifice of a drive head of the wrench, and the draining assembly including a coupling shaft, a fitting member, a first joining tube, and a fixing member;
   wherein the fitting member is rotatably accommodated in the receiving orifice of the drive head; a first segment of the fitting member is connected with or is removed from a first segment of the coupling shaft; a first end of the first joining tube is fitted in the first segment of the coupling shaft and inserts into the fitting member; a first segment of the fixing member is rotatably connected with a second segment of the coupling shaft; an axial line of the fixing member extends from the first segment of the fixing member to a second segment of the fixing member and insects with a central line of the coupling shaft perpendicularly;
   wherein the first joining tube has an accommodation orifice extending along a central axis thereof, and the first joining tube has an axial orifice communicating with the accommodation orifice, wherein the coupling shaft has a blind orifice extending in a central axis thereof and communicating with the axial orifice of the first joining tube, the coupling shaft further has multiple radial orifices communicating with the blind orifice, wherein the fixing member has a first connection hole communicating with a second connection hole and the multiple radial orifices of the coupling shaft; the axial orifice of the first joining tube, the blind orifice and the multiple radial orifices of the coupling shaft, and the first connection hole and the second connection hole of the fixing member form an oil supply path.

2. The oil drain combination as claimed in claim 1, wherein the first segment of the coupling shaft is an external threaded section, the first segment of the fitting member is an internal threaded section screwed with the external threaded section of the coupling shaft, thus connecting the fitting member and the coupling shaft.

3. The oil drain combination as claimed in claim 1, wherein the second segment of the coupling shaft is an axial extension, two sealing rings are fitted on two connection portions of the axial extension and the fixing member, the multiple radial orifices are defined on the axial extension between the two sealing rings; the fixing member has a circular orifice defined on the first segment thereof and fitting with the axial extension, and the circular orifice is in communication with the multiple radial orifices; an engagement loop is rotatably engaged in the second segment of the coupling shaft to position the first segment of the fixing member.

4. The oil drain combination as claimed in claim 3, wherein the fixing member has a second joining tube and a connector, a first end of the connector is fitted on a distal end of the second joining tube, the second joining tube has the circular orifice defined on a first end thereof; and a second end of the connector extends out of the second joining tube; the first connection hole is communicated with the second joining tube; and the second connection orifice is in communication with the connector.

5. The oil drain combination as claimed in claim 4, wherein a control sleeve is defined between the first connection hole and the second connection hole to open or close a communication of the first connection hole and the second connection hole.

6. The oil drain combination as claimed in claim 5, wherein the control sleeve is received in the first connection hole, a spring contacts with the control sleeve and the connector, wherein the spring pushes the control sleeve to abut against a contact fence of the first connection hole so as to close the first connection hole and the second connection hole.

7. The oil drain combination as claimed in claim 1, wherein the wrench includes a grip, a drive head, a connection element configured to rotatably connect the grip and the drive head so that the drive head is rotated around the connection element to change a connection angle of the drive head and an angle of the work segment of the oil drain combination.

8. The oil drain combination as claimed in claim 1, wherein the fitting member is any one of an elongated fitting sleeve, a short fitting sleeve and a connection rod.

* * * * *